United States Patent [19]

Fox

[11] 4,101,240
[45] Jul. 18, 1978

[54] NOZZLE REFACING TOOL

[76] Inventor: Ray D. Fox, 1912 W. 28th St., Odessa, Tex. 79763

[21] Appl. No.: 784,443

[22] Filed: Apr. 4, 1977

[51] Int. Cl.² .................. B23B 51/00; B23B 3/22; B27F 1/08
[52] U.S. Cl. .................. 408/211; 82/4 C; 144/205
[58] Field of Search .......... 82/4 C; 144/205; 408/199, 200, 201, 202, 203, 204, 205, 206, 211, 223, 224, 227, 228, 194

[56] References Cited

U.S. PATENT DOCUMENTS

| 2,242,821 | 5/1941 | Fanslow | 408/211 |
| 3,232,145 | 2/1966 | Wilson | 144/205 |
| 3,870,432 | 3/1975 | Strybel | 408/228 |

*Primary Examiner*—Harrison L. Hinson

*Attorney, Agent, or Firm*—Marcus L. Bates

[57] ABSTRACT

A refacing tool by which the spaced seating surfaces of an oxy-acetylene cutting torch nozzle can be refaced. The tool includes a main body member from which there extends a plurality of support members. The support members are affixed to the main body and are radially spaced from one another and support a guide member. The support members each have cutting means thereon for simultaneously engaging the spaced seating surfaces of the nozzle. The guide member slidably receives the nozzle therethrough. In one embodiment of the invention, a second guide member is supported by a mid-portion of the support members and telescopingly receives a marginal end portion of the nozzle therewithin. The refacing tool restores the seating surfaces of the torch nozzle and represents a considerable savings to the welding industry which heretofore was not realized.

14 Claims, 12 Drawing Figures

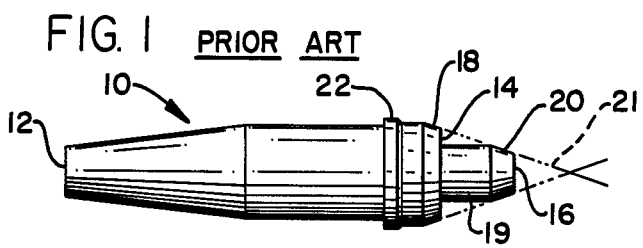
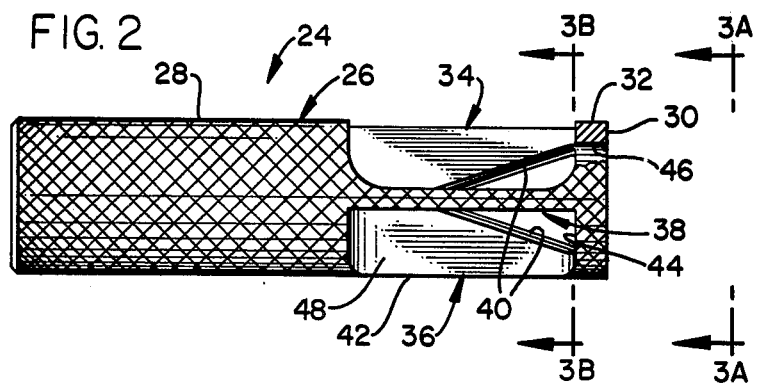
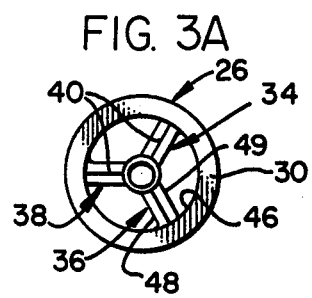
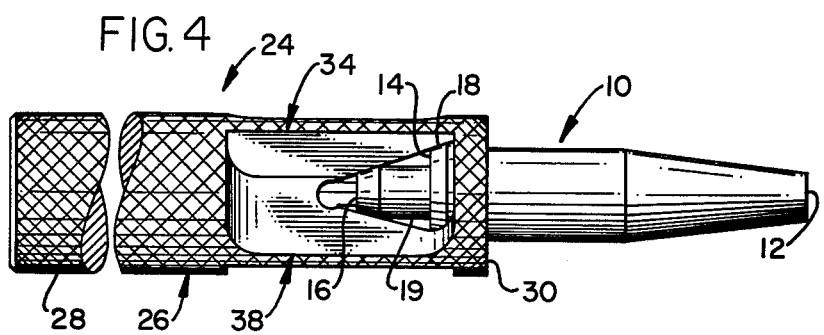
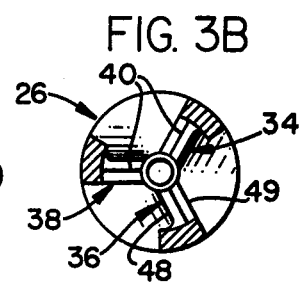
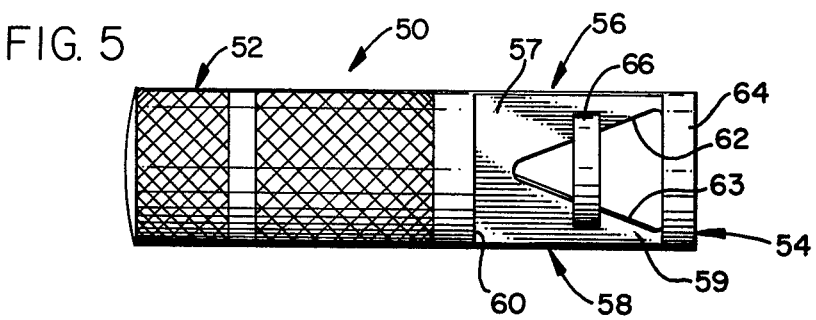
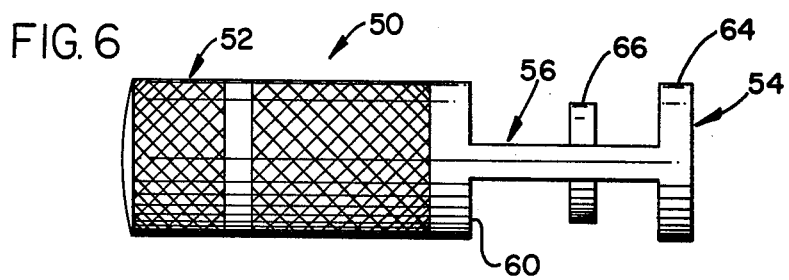

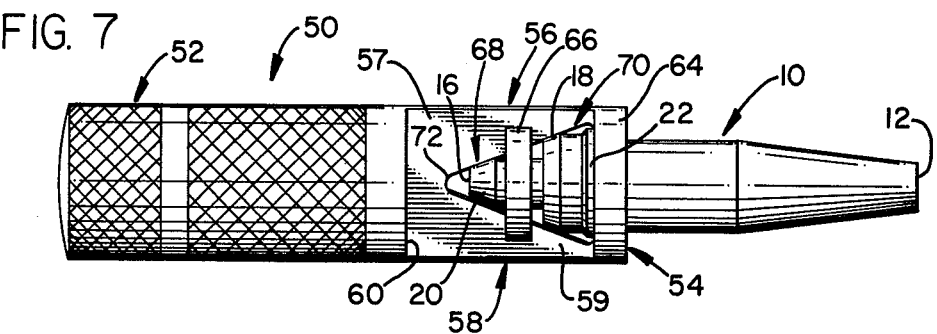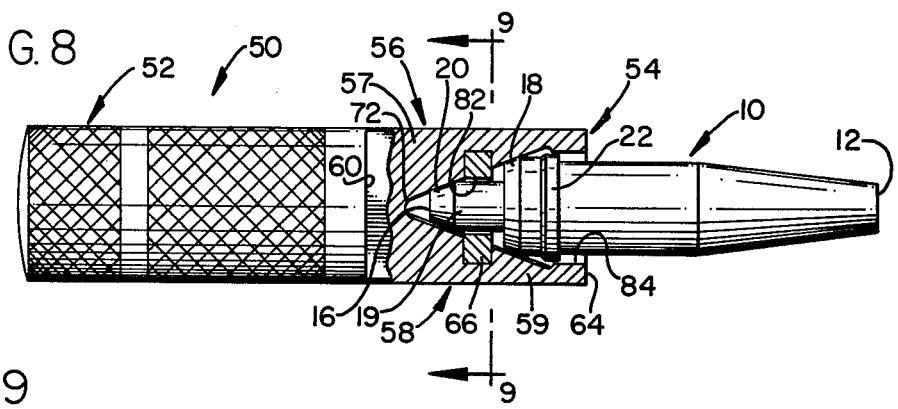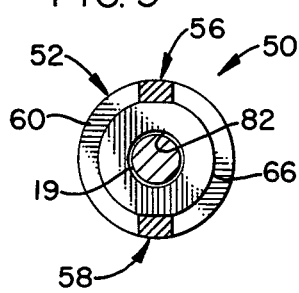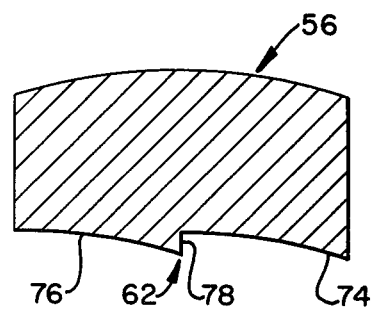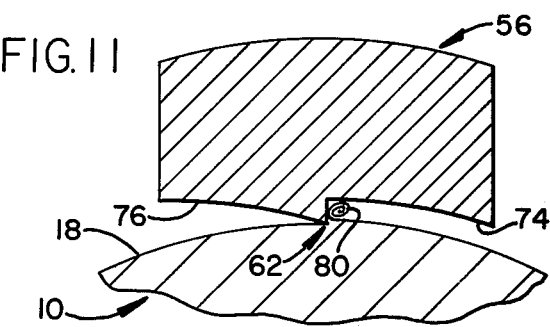

NOZZLE REFACING TOOL

BACKGROUND OF THE INVENTION

Nozzles, such as used in conjunction with oxygen-acetylene cutting torches, are provided with an axial passageway and a plurality of radial passageways spaced thereabout. The axial and the radial passageways are connected to a supply of oxygen and acetylene. Spaced external seats formed on the nozzle cooperate with spaced internal seats formed within the torch body and provide means by which the nozzle can be removably affixed to the cutting torch in such a manner to provide separate streams of oxygen and acetylene thereto. Over a period of time the seats on the nozzle become worn or damaged and premature mixing of the oxygen and acetylene will occur, thereby permitting the flame to "flash-back" or travel back up into the torch assembly whereupon the entire torch assembly is often ruined. Accordingly, when either of the seats become unduly worn or pitted, the nozzle is usually discarded because it is no longer suitable for its intended purpose.

A plurality of nozzles of different size are usually provided in conjunction with each torch assembly in order that the more expensive torch barrel can be mated with different ones of the nozzles to thereby enable the cutting of several different sizes of metal. The nozzles are expensive and the replacement thereof constitutes a considerable expenditure of money over a period of time.

Accordingly, it would be desirable to be able to reface the worn seats on the nozzle of an oxygen-acetylene torch from time to time thereby enabling the expensive nozzle to be reclaimed. It is desirable that restoration of the nozzle seats be accomplished in a simple and rapid manner. It would be especially desirable to be able to provide a tool which would restore a nozzle in a quick, safe, and simple manner.

SUMMARY OF THE INVENTION

This invention relates to shop tools and specifically to a tool by which the external spaced seating surfaces of an oxygen-acetylene torch nozzle can be refaced. The tool is comprised of a main body which can be held by hand, and by which the tool can be manipulated.

Radially spaced apart support members are affixed to the main body and extend longitudinally therefrom in spaced relation respective to one another and to the axial centerline of the main body member. The support members include a cutting face arranged thereon for simultaneously engaging both spaced seating surfaces of the nozzle. A guide member is supported by the outer extremity of the support members. The guide member is in the form of an annular skirt which telescopingly receives the torch nozzle in a guidable manner therewithin, such that the seats of the nozzle are aligned with the cutting face of the support member.

One form of the invention includes two guide members and two support members. The second of the two guide members is located in supported relation along a medial portion of the support members and is in the form of a second annular skirt of reduced diameter.

In each embodiment of the invention, the nozzle is held in aligned relationship respective to the guide members with the spaced seats of the nozzle contacting the cutting faces in a manner whereby axial rotation of the tool relative to the nozzle causes the cutting faces to remove material from the spaced seats in an amount to provide a new seating surface therefor.

Therefore, a primary object of the present invention is the provision of improvements in refacing tools by which spaced seating surfaces of an oxygen-acetylene torch nozzle can be refaced.

Another object of this invention is to provide a tool for simultaneously refacing spaced seats on an oxygen-acetylene torch nozzle.

A further object of this invention is to disclose and provide a novel hand held tool for repairing worn and damaged oxygen-acetylene torch nozzles.

A still further object of this invention is to provide a tool which can be mated with an oxygen-acetylene torch nozzle and manipulated in a manner to simultaneously reface the spaced seats on the nozzle.

These and various other objects and advantages of the invention will become readily apparent to those skilled in the art upon reading the following detailed description and claims and referring to the accompanying drawings.

The above objects are attained in accordance with the present invention by the provision of apparatus fabricated in a manner substantially as described in the above abstract and summary.

BRIEF DESCRIPTION OF THE DRAWINGS

FIG. 1 is a side elevational view of a prior art torch nozzle which can be refaced in accordance with the present invention;

FIG. 2 is a side elevational view of a refacing tool of the present invention;

FIG. 3A is an end view of the tool of FIG. 2 taken along the line 3A—3A of FIG. 2;

FIG. 3B is a cross-sectional view taken along line 3B—3B of FIG. 2;

FIG. 4 is a side elevational view of the tool of FIGS. 2 and 3 together with the nozzle of FIG. 1;

FIG. 5 is a side elevational view of another embodiment of this invention;

FIG. 6 is another side elevational view of the tool disclosed in FIG. 5;

FIG. 7 is a perspective view of the refacing tool of FIGS. 5 and 6 disclosed in conjunction with the oxygen-acetylene torch nozzle of FIG. 1;

FIG. 8 is a part cross-sectional view of the tool disclosed in FIG. 7;

FIG. 9 is a cross-sectional view taken along line 9—9 of FIG. 8;

FIG. 10 is an enlarged fragmented cross-sectional view of part of the tool disclosed in the foregoing figures; and FIG. 11 is a cross-sectional view of the tool disclosed in FIG. 8, operatively disclosed in conjunction with a torch nozzle.

DETAILED DESCRIPTION OF THE PREFERRED EMBODIMENTS

FIG. 1 discloses a prior art nozzle 10 for an oxygen-acetylene cutting torch. The nozzle has the usual outlet end 12 opposed to the illustrated inlet end. The inlet end includes a plurality of radially spaced passageways which commence at shoulder 14, and also includes an axial passageway at 16. A large outside diameter seat 18 is spaced from a small outside diameter seat 20 by the illustrated neck 19. The large and small outside diameter seats are formed with a seat face which lies along a common plane 21. A circumferentially extending flange 22 enables the nozzle to be removably affixed to the barrel of the torch assembly (not shown).

FIG. 2 discloses a refacing tool 24 of the present invention by which the spaced seating surfaces 18 and 20 of an oxyacetylene cutting torch nozzle 10 can be refaced. The tool includes a main body member 26 and preferably is provided with a handle 28 which can be conveniently held in one's hand. The opposed end of the tool terminates in the illustrated guide means 30 which has an outside diameter 32. The guide means is in the form of a cylindrical skirt and is supported from a plurality of radially spaced support members 34, 36 and 38. The support members preferably are an integral part of the handle and are formed by removing metal from a marginal end thereof, although the support members could equally well be comprised of individual members affixed in a rigid manner to one end of the handle of the tool.

As seen in FIGS. 2-4, a cutting face 40 is formed on the inside surface of the support members, while the outer edge portion 42 thereof is a continuation of the handle portion thereof. Each of the support members include opposed sidewalls 48 and 49. Numeral 46 indicates the inside diameter of the guide 30 while numeral 44 indicates the wall surface of the guide which is opposed to the terminal end 30 and is adjacent to the handle.

FIG. 4 illustrates the tool of FIG. 2 operatively associated with a prior art nozzle, such as seen in FIG. 1, for example. As seen in FIG. 4, the spaced faces of seats 18 and 20 contact the spaced cutting edges of each of the three support members so that the faces of seats 18 and 20 are simultaneously engaged by spaced marginal lengths of the cutting surface 40. As the handle is rotated relative to the nozzle, the cutting face removes material from the spaced seats.

FIGS. 5-8 illustrate a second embodiment of a refacing tool 50 having a handle 52 spaced from a large guide member 54. The guide member is supported by two support members 56 and 58. The support members preferably are integrally connected to the handle 52 and are formed by reducing the material thereof to form a single blade member 57, with the blade member being bifurcated to form the individual support members.

Each of the support members is provided with a cutting face. Member 57 is provided with cutting face 62 while member 58 is provided with a cutting face 63. The large guide member 54 is supported by the marginal terminal ends of the support members, while a small guide member 66 is supported by a medial portion of each of the support members.

As best seen in FIG. 7, the spaced seats 18 and 20 of the nozzle bear against spaced marginal edge portions of the cutting face of the support members as illustrated by the arrows at numeral 68 and 70. The neck 19 of the nozzle is telescopingly received within the small guide member and is thereby maintained concentrically aligned respective to the longitudinal axial centerline of the tool. The circumferentially extending flange 22 of the nozzle is guidably received by the large guide member 54, thereby providing a guide means which maintains another spaced portion of the nozzle concentrically aligned respective to the longitudinal axial centerline of the tool. The two guide means are spaced from one another and accordingly, maintains the relationship of the nozzle and the tool cutting edges in properly aligned relationship with great accuracy.

The cutting edges of the support members extend towards shoulder 60 and terminate as indicated by numeral 72 at a position which leaves a substantial amount of space under the end of the nozzle.

In FIG. 10, the operative relationship between the support member 56 and the before mentioned cutting face 62 is more clearly illustrated. The cutting face 62 is formed by the illustrated two curved spaced faces 74 and 76 which leave shoulder 78 therebetween, thereby defining a cutting edge which extends along the cutting face of the support member.

As seen in FIG. 11, the shoulder 78 cooperates with face 74 and 76 to provide the illustrated sharp cutting edge which engages the entire surface area of a seat 18, for example, thereby accurately removing a small amount of material 80 as the tool and nozzle are rotated axially respective to one another.

As specifically illustrated in FIG. 8, the inside peripheral surface areas 82 and 84, respectively, of the small and large guide members 66 and 64, respectively, maintain the nozzle in properly aligned indexed relationship respective to the cutting edges of the tool, thereby enabling the cutting edge of the support members to accurately form a new face on each of the spaced seats of the nozzle.

In operation, the tool of the present invention is mated with a nozzle such as seen in FIG. 1, by inserting the inlet end of the nozzle within the cutting end of the tool, as illustrated in FIGS. 4, 7 and 8. The nozzle is held in one hand while the handle of the tool is held in the other hand and relative axial rotation is then imparted between the nozzle and the tool.

In the first embodiment of the invention, the circumferentially extending flange 22, which is a marginal medial portion of the nozzle, is received in close tolerance relationship respective to the inside diameter 46 of the large guide member. Concurrently therewith the small diameter seat 20 is received by a marginal portion of each of the radially spaced apart cutting faces such that the cutting edges 40 thereof accurately and simultaneously contact three radially spaced apart areas of the small diameter nozzle seat. At the same time the large diameter nozzle seat is likewise contacted by a marginal area of each of the spaced apart cutting edges. This cooperative action between the refacing tool and the nozzle provides three different alignment means along the nozzle; namely: at 22, 18, and 20; with there being seven areas of contact therebetween.

The nozzle and tool are rotated relative to one another, thereby simultaneously cutting material from both nozzle seats in the illustrated manner of FIG. 11 until visual inspection indicates that both of the seats have been suitably refaced and are ready to be installed in the oxy-acetylene torch.

In the second embodiment of the invention, a small guide means 66 is interposed between the seats 18, 20, thereby providing a guide means at 54, 18, 66, and 20. The spaced apart guide means of FIGS. 5-9 maintains the nozzle and the refacing tool in properly aligned relationship so that both faces on the nozzle are properly restored.

I claim:

1. A refacing tool by which spaced seating surfaces of an oxygen-acetylene torch nozzle can be refaced, comprising:

a main body by which said tool can be manipulated;
a plurality of support members having opposed ends with one of said opposed ends being affixed to said main body and the other of said opposed ends extending therefrom and in radially spaced relation to one another;

said radially spaced support members each having a cutting face formed thereon for simultaneously engaging the spaced seating surfaces of the nozzle;

a guide member affixed to the free ends of said support members for telescopingly receiving a marginal length of the torch nozzle therewithin with spaced marginal lengths of said cutting face being brought into engagement with the spaced seating surfaces of the nozzle, whereupon the refacing tool can be axially rotated respective to the longitudinal axis of the nozzle to cause the cutting face to remove material from and thus reface the spaced seating surfaces.

2. The refacing tool of claim 1 wherein said tool is limited to two diametrically opposed radially spaced support members, and said cutting face includes a cutting edge thereon.

3. The refacing tool of claim 1 wherein the cutting face on each of said spaced support members is in the form of a cutting edge which diverges outwardly away from said main body such that the included angle between said cutting edge of said support members determines the angle of conicity of the face of the reseated surface of the nozzle.

4. The tool of claim 1, and further including a second guide member supported by a medial length of each of the support members, said second guide member is in the form of a reduced diameter annular member which circumferentially extends about and telescopingly receives a marginal length of the torch nozzle therewithin.

5. The tool of claim 1 wherein there are only two diametrically opposed radially spaced support members; said tool further includes a second guide member supported by an intermediate length of the support members, said second guide member is in the form of a circumferentially extending skirt which telescopingly receives a marginal length of the torch nozzle therewithin, with the large seat of the nozzle being located between the guide members and the small seat of the nozzle being located between the small guide member and the main body.

6. The tool of claim 1 wherein each of said spaced support members are in the form of a blade, said blade includes a cutting edge which faces towards the longitudinal axial centerline of the tool, each said support member diverges outwardly away from said axial centerline such that the included angle between said cutting edges determines the angle of the face of the reseated surface of the nozzle; and further including a second guide member formed by an intermediate part of the cutting edges, said second guide member circumferentially extends about and telescopingly receives part of the small face of the torch nozzle therewithin.

7. The tool of claim 1 wherein there is provided two diametrically opposed spaced support members; each of said spaced support members is provided with a blade, said blade has a cutting edge thereof placed towards said axial centerline; said cutting edges diverge outwardly away from said main body such that the included angle between said cutting edges determines the angle of conicity of the faces of the reseated surfaces of the nozzle.

8. The tool described in claim 1, and further including a second guide member supported between said main body and the outer extremity of said support members, said second guide member is in the form of a circumferentially extending skirt which telescopingly receives the neck of the torch nozzle therewithin; there being only two diametrically opposed, radially spaced support members; wherein each of said spaced support members includes a cutting face having a cutting edge thereon which is placed towards said axial centerline, said cutting edges diverge outwardly away from said main body such that the included angle between said cutting edges determines the angle of conicity of the face of the reseated surface of the nozzle.

9. A tool for refacing seats on a nozzle, wherein the nozzle has external conical seats by which flow into spaced passageways thereof is separated;

said tool comprising a main body by which the tool can be manipulated; an annular guide member, and radially spaced support members; said support members being affixed to said main body and extending therefrom to present a free end portion, said guide member being affixed to said free end portion and being of a size to telescopingly receive the nozzle therethrough in a slidable manner along the axial centerline of the tool and the nozzle;

each of said support members having means forming a cutting edge thereon for simultaneously engaging the spaced seats in a cutting manner to remove material therefrom;

and means forming a second guide means spaced from the first guide means, said second guide means contacts the nozzle at a location spaced from the area of contact of the first guide means.

10. The tool of claim 9 wherein said guide member is of annular construction and is supported by the outer extremity of the support member, said second guide member is in the form of a circumferentially extending skirt which telescopingly receives the neck of the torch nozzle therewithin.

11. The tool of claim 9 wherein said second guide member is supported by an intermediate portion of the support member, said second guide member is in the form of a circumferentially extending skirt which telescopingly receives the neck of the torch nozzle therewithin.

12. The tool of claim 9 wherein said tool is limited to two diametrically opposed spaced support members, said second guide member is in the form of a circumferentially extending skirt which telescopingly receives the torch nozzle therewithin.

13. The tool of claim 9 wherein each of said spaced support members is in the form of a blade, said blade has a cutting edge placed towards the axial centerline thereof, said cutting edge diverges outwardly away from said main body such that the included angle between said cutting edges determine the angle of conicity of the faces of the reseated surfaces of the nozzle; said second guide member is in the form of a circumferentially extending skirt which telescopingly receives the neck of the torch nozzle therewithin.

14. The tool of claim 9 wherein said tool is limited to two diametrically opposed spaced support members; wherein each of said spaced support members is in the form of a blade, said blade has a cutting edge formed thereon which is orientated towards said axial guide member, said blade diverges outwardly away from said main body such that the included angle between said cutting edges determines the angle of the face of the reseated surface of the nozzle.

* * * * *